Aug. 25, 1964  E. T. J. TAPP ETAL  3,145,798
DRIVING TRANSMISSION FOR THE REAR AND FRONT
WHEELS OF MOTOR VEHICLES
Original Filed Nov. 30, 1959  3 Sheets-Sheet 1

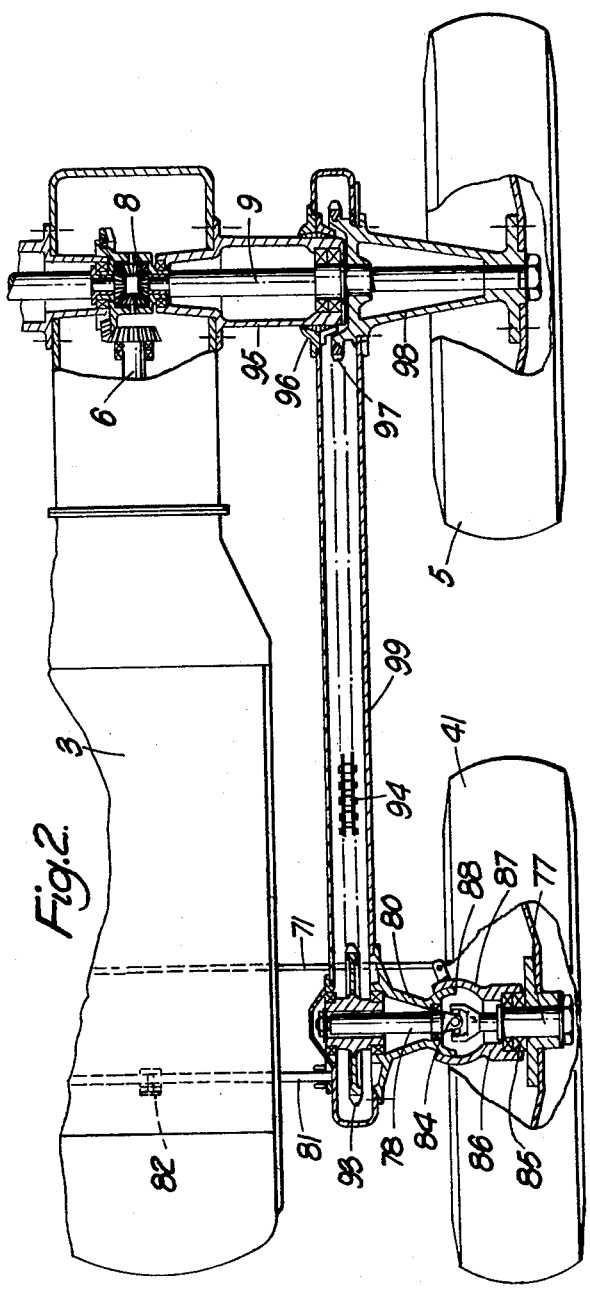

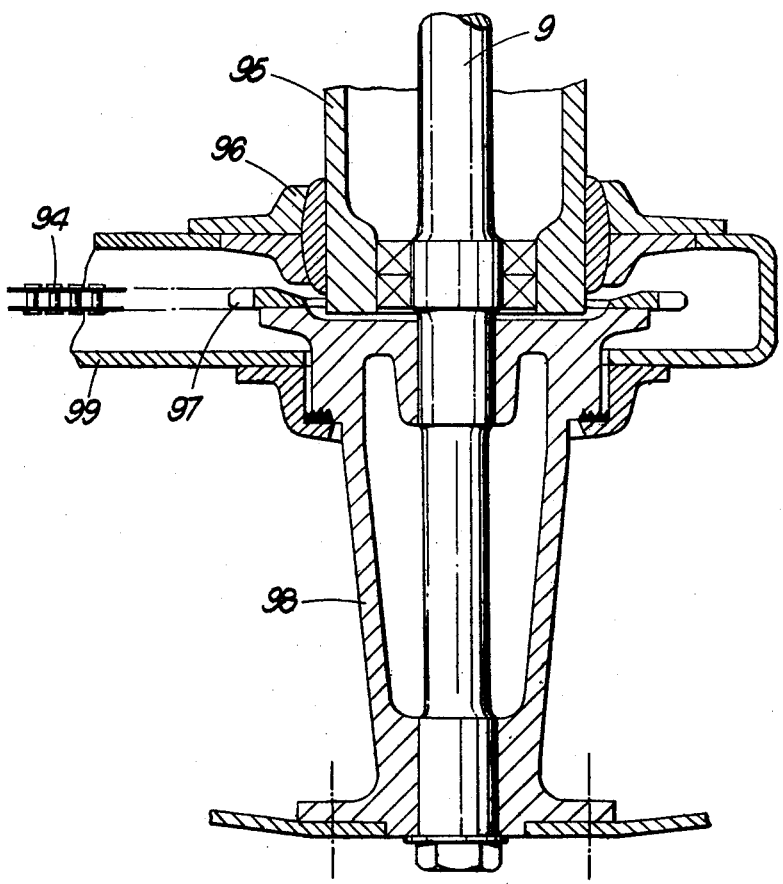

United States Patent Office 3,145,798
Patented Aug. 25, 1964

3,145,798
DRIVING TRANSMISSIONS FOR THE REAR AND FRONT WHEELS OF MOTOR VEHICLES
Ernest Thomas James Tapp and Joseph Davey, Aldershot, England, assignors to County Commercial Cars Limited, Aldershot, England, a British company
Original application Nov. 30, 1959, Ser. No. 856,057, now Patent No. 3,054,468, dated Sept. 18, 1962. Divided and this application June 19, 1961, Ser. No. 117,961
Claims priority, application Great Britain Dec. 2, 1958
7 Claims. (Cl. 180—44)

This application is a divisional of our co-pending United States application Serial No. 856,057 filed November 30, 1959 for "Driving Transmissions for the Rear and Front Wheels of Motor Vehicles" and since issued as Patent No. 3,054,468.

This invention relates to driving transmissions for the rear wheels and front wheels of a motor vehicle at least one of which pairs is steerable and particularly for a four wheeled drive tractor and has for an object to provide a simple and light and robust arrangement.

According to this invention a motor driven vehicle comprises steerable wheels at one end on opposite sides thereof and non-steerable wheels at the other end on opposite sides thereof, an engine, a supporting structure projecting laterally from said sides of the vehicle where a pivotal connection between the vehicle and supporting structure permits the structure to rock about a fore and aft axis, a casing fixed to each end of said structure, a driving shaft rotatable in said casing, a mounting for a steerable wheel axle pivotally connected to each casing to swing about an axis extending in an up and down direction, a universal joint connecting said shaft to the steerable wheel axle, a steering transmission adapted to swing both said mountings, a driving axle for each non-steerable wheel mounted in an axle casing, a transmission connecting each said axle to one of the driving shafts, a fore and aft extending casing enclosing each said transmission and fixed at one end to one of said casings for the driving shaft and a universal joint connecting the other end of each fore and aft extending casing to one of said axle casings.

In one form of the invention each said transmission is a gear transmission comprising a fore and aft shaft extending through each said fore and aft extending casing, a gear wheel fixed to one end of each said fore and aft shaft and in mesh with a gear wheel on one of said driving shafts for one end of a steerable wheel, a gear wheel fixed to each said axle shaft in mesh with a gear wheel on a spindle in the axle casing and a universal joint connecting said spindle to the other end of the fore and aft extending shaft.

In an alternative arrangement each said transmission comprises a chain and sprocket transmission comprising a sprocket wheel fixed to said driving shaft in each casing fixed to said support a sprocket wheel fixed in relation to the axle shaft for each non-steered wheel; a chain encircling said sprocket wheels and extending through said fore and aft extending casing.

In such arrangements non-steerable wheels are driven through a differential gear having output shafts either driving said wheels direct or driving said wheels through lay shafts geared thereto and wherein either said lay shafts or said output shafts are arranged to drive said transmissions.

In the case where a gear transmission is provided, each said axle shaft may comprise said lay shaft driving said spindle through meshing gear wheels.

In the case where the transmission is a chain and sprocket transmission a sprocket wheel is fixed to each axle shaft which directly drives a non-steerable wheel.

The following is a description of two embodiments of the invention reference being made to the accompanying drawings in which:

FIGURE 2 is a similar view to FIGURE 1 showing an arrangement in which the steerable wheels are driven through a chain and sprocket transmission.

FIGURE 3 is an enlarged view of the universal joint between the axle casing and the transmission casing.

Figure 1:
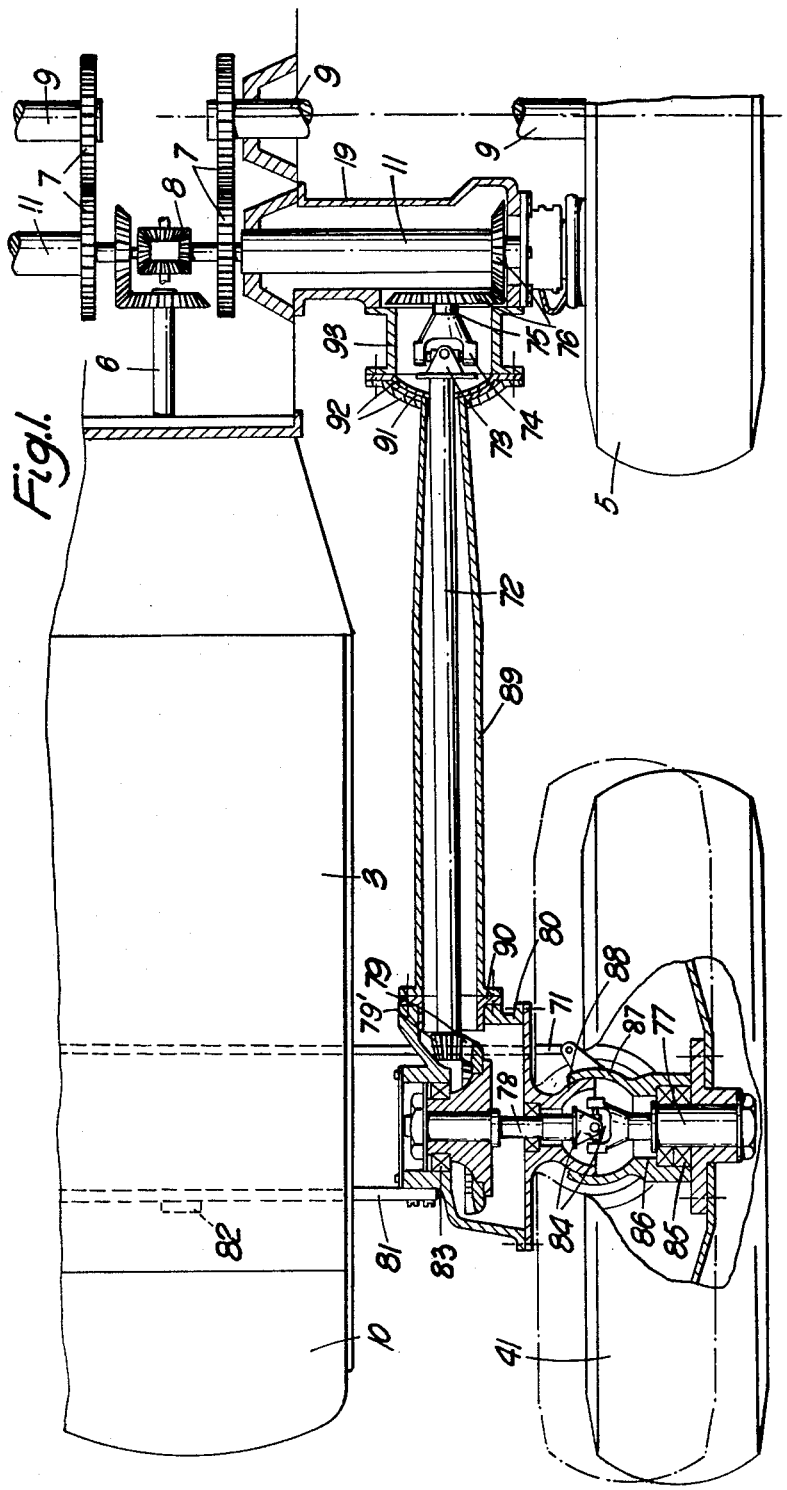
FIGURE 1 is a plan view of part of a tractor, parts of which are shown in section, and shows an arrangement in which the steerable wheels are driven through a gear transmission.

Referring to the arrangement shown in FIGURE 1, the front part of a tractor 10 has pivotally secured at 82 to the underside thereof a supporting structure 81 which projects from the sides of the tractor. As will be seen, the supporting structure is comparatively slender and thus can resiliently yield in a fore and aft direction, as well as twist about its longitudinal axis. Each end of the structure 81 is fixed to a first gear casing 80 having a driving shaft 78 mounted in bearings 83 and which has fixed to it a bevel gear 79.

The driving shaft 78 is connected by a Hooke's type joint 84 to a steerable wheel spindle 77. This wheel spindle 77 is carried by a bearing 85 in a housing 86 having a partial spherical shell 87 which embraces a partial spherical shell 88 of the fixed casing 80, the centers of the spheres and of the Hooke's joint coinciding. A steering transmission 71 is adapted to control the steering of the front wheels 41.

Each bevel gear wheel 79 is in mesh with a bevel pinion indicated by reference numeral 79' on a fore and aft extending shaft 72 which is surrounded by a tubular third casing 89, one end of which is rigidly fixed at 90 to the gear casing 80 associated with the front wheel 41. The other end of casing 89 is provided with a partial spherical flange 91 arranged within a spherical socket 92 which is a part of a second casing 93 which houses the Hooke's joint 73, 74. The part 74 of this Hooke's joint is fixed to a spindle 75 mounted in the second casing 93 and is driven by a lay axle shaft 11 through bevel gearing 76. The lay axle shaft 11 is located in housing 19 and constitutes the output shaft for the differential gear 8 and is driven by the engine 3 through the customary propeller shaft 6 and, in addition to driving the spindle 75, drives the axle 9 which in turn drives the rear wheel 5 (indicated by the chain line) through a transmission 7.

The centers of the sperical flange 91 and the socket 92 coincide with the center of the latter Hooke's joint 73, 74.

The arrangement shown in FIGURE 2 is similar to that last described above but instead of each shaft 78 being driven by bevel gearing it has fixed to it a sprocket wheel 93 which is encircled by a chain 94 also encircling a sprocket wheel 97 fixed to one of the wheel hubs 98. The chain is enclosed in a casing 99 fixed at its forward end to the casing 80 and mounted on the axle casing 95 at its rear end by a universal joint 96. In such an arrangement, the differential 8 may drive the wheel shafts 9 in a conventional manner rather than through lay shafts. Alternatively the wheel shafts may be driven through lay shafts driven by the differential and the sprocket wheels may be mounted on the lay shafts.

We claim:

1. A motor driven vehicle having steerable wheels at one end on opposite sides thereof and non-steerable wheels at the other end on opposite sides thereof, an engine, a resilient supporting structure projecting laterally from the sides of the vehicle and yieldable in a fore and aft direction, a pivotal connection between the vehicle and the supporting structure permitting the structure to rock about a fore and aft axis and which supporting structure is thus adapted to yield both torsionally about a transverse axis and in a fore and aft direction, a first casing fixed to each end of said structure, a driving shaft rotatable in said first casing, a mounting for a steerable wheel axle pivotally connected to each first casing to swing about an axis extending in an up and down direction, a universal joint connecting said driving shaft to the steerable wheel axle, a steering transmission adapted to swing both said mountings, a lay axle shaft rotating with each non-steerable wheel, a spindle mounted in a second casing, transmission means interconnecting the lay axle shaft and the spindle, a fore and aft extending shaft connecting said spindle to said driving shaft in the first casing, a third casing extending in a fore and aft direction and enclosing said fore and aft extending shaft and fixed at one end to one of said first casings and a universal joint connecting the other end of each third casing to one of said second casings.

2. A motor driven vehicle according to claim 1 and wherein a gear wheel is fixed to one end of each said fore and aft extending shaft and is in mesh with a gear wheel on one of said driving shafts for one of the steerable wheels, and wherein the transmission means includes a gear wheel fixed to each said lay axle shaft in mesh with a gear wheel on a spindle in said second casing and wherein a universal joint connects said spindle to the other end of the fore and aft extending shaft.

3. A motor driven vehicle according to claim 1 in which the non-steerable wheels are driven through a differential gear having two output shafts, said output shafts constituting said lay axle shafts and geared to the non-steerable wheels, said lay axle shafts being arranged to drive said transmissions through said last-named means.

4. A motor driven vehicle according to claim 1 in which the non-steerable wheels are driven through a differential gear having two output shafts, said output shafts constituting said lay axle shafts and geared to the non-steerable wheels, said lay axle shafts being arranged to drive, through gearing which constitutes the last-named means, the spindles, and additional universal joints connect said spindles and the fore and aft extending shafts to thereby drive the driving shafts for the steerable wheels.

5. A motor driven vehicle having steerable wheels at one end on opposite sides thereof and non-steerable wheels at the other end on opposite sides thereof, an engine, a resilient supporting structure projecting laterally from the sides of the vehicle and yieldable in a fore and aft direction, a pivotal connection between the vehicle and the supporting structure permitting the structure to rock about a fore and aft axis and which supporting structure is thus adapted to yield both torsionally about a transverse axis and in a fore and aft direction, a first casing fixed to each end of said structure, a driving shaft rotatable in said first casing, a mounting for a steerable wheel axle pivotally connected to each first casing to swing about an axis extending in an up and down direction, a universal joint connecting said driving shaft to the steerable wheel axle, a steering transmission adapted to swing both said mountings, an axle shaft driving each non-steerable wheel, a second casing for each axle shaft, transmission means extending in a fore and aft direction interconnecting the axle shaft and the driving shaft in the first casing, a third casing extending in a fore and aft direction and enclosing said transmission means and fixed at one end to one of said first casings, a universal joint connecting the other end of each third casing to one of said second casings, said last-mentioned transmission means comprising a chain and sprocket drive having a sprocket wheel fixed to said driving shaft in each first casing fixed to said supporting structure, a sprocket wheel fixed to said axle shaft for each non-steerable wheel, and a chain encircling said sprocket wheels and extending through said fore and aft extending third casing.

6. A motor driven vehicle according to claim 5 in which the non-steerable wheels are driven through a differential gear having output shafts driving said non-steerable wheels directly and wherein said output shafts constitute said axle shafts and are arranged to drive said last mentioned transmissions.

7. A motor driven vehicle according to claim 5 in which the axle shafts on which the non-steerable wheels are mounted are driven through a differential gear from a propeller shaft driven by the said engine.

References Cited in the file of this patent
UNITED STATES PATENTS

| | | |
|---|---|---|
| 1,164,206 | Pamer | Dec. 14, 1915 |
| 1,239,990 | Ware | Sept. 11, 1917 |
| 1,244,512 | Ledbetter | Oct. 30, 1917 |
| 1,421,024 | Pifer | June 27, 1922 |
| 2,595,494 | Stratman | May 6, 1952 |

FOREIGN PATENTS

| | | |
|---|---|---|
| 632,372 | France | Oct. 1, 1927 |
| 1,105,182 | France | June 29, 1955 |
| 770,667 | Great Britain | Mar. 20, 1957 |